R. D. GIVEN.
STARTING AND CONTROLLING MECHANISM.
APPLICATION FILED AUG. 3, 1914.
1,188,169.　　　　　　　　　　　　Patented June 20, 1916.
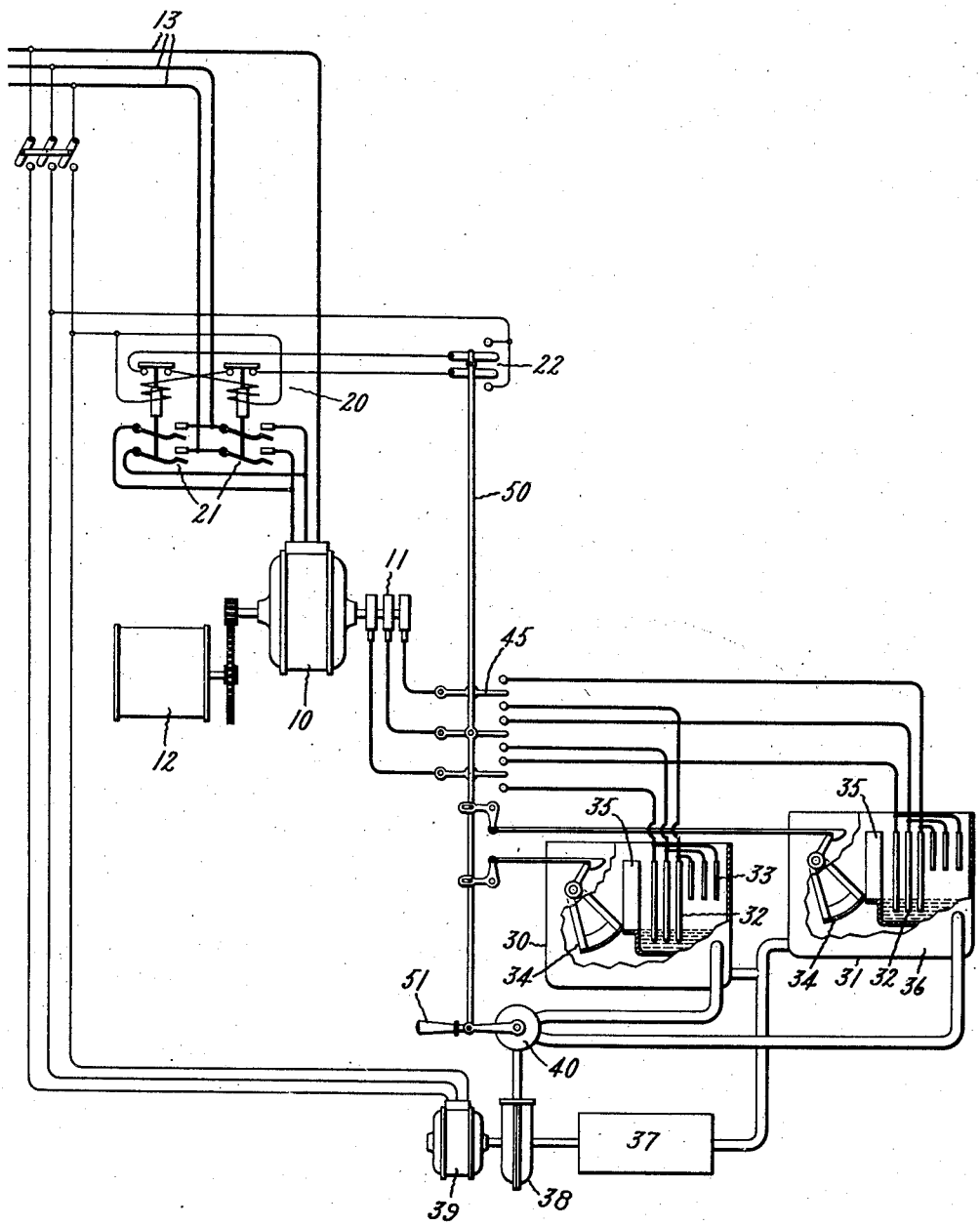
Witnesses:
Inventor:
Ralph David Given,
by Albert G. Davis
His Attorney.

UNITED STATES PATENT OFFICE.

RALPH DAVID GIVEN, OF CRICK, ENGLAND, ASSIGNOR TO GENERAL ELECTRIC COMPANY, A CORPORATION OF NEW YORK.

STARTING AND CONTROLLING MECHANISM.

1,188,169.

Specification of Letters Patent. Patented June 20, 1916.

Application filed August 3, 1914. Serial No. 854,662.

*To all whom it may concern:*

Be it known that I, RALPH DAVID GIVEN, a subject of the King of Great Britain, residing at "Carbrock," West Haddon Road, Crick, county of Northampton, England, have invented certain new and useful Improvements in Starting and Control Mechanisms, of which the following is a specification.

My invention relates to starting and control mechanisms for electric motors, and more especially to those using liquid rheostats in the secondary circuit of asynchronous motors.

In certain cases where a motor of this type is utilized to drive a machine requiring instantaneous electrical control under all working conditions of load and speed, and where a braking action is secured by reversing the current supplied to the stator, it is desirable that the control mechanism be conveniently arranged to allow quick action. If a single liquid rheostat be used in the secondary of the asynchronous motor, it is difficult to quickly change the amount of resistance in circuit. Supposing that the motor has been running at maximum speed with all the resistance cut out, the shock will be great if the primary connections are reversed in order to secure a braking action, for the reason that the motor attempts to start at full speed in the reverse direction.

The object of my invention, therefore, is to devise a simple and convenient starting and control mechanism for use in connection with an asynchronous motor having a liquid rheostat connected to its secondary winding. I have secured this object by providing two liquid rheostats adapted to be connected to the secondary of the asynchronous motor. The usual reversing switch is located in the primary circuit, and a transferring switch inserted between the secondary and the rheostats. A pump and cooling reservoir are provided in connection with these rheostats, the pump being adapted to be connected to one or the other, as desired, while the reservoir is connected to both.

I have provided a discharge valve and weir for each rheostat so that their tanks may be practically emptied and then gradually filled to submerge the plates. By means of the weir, the water is thereafter maintained at a constant level while being circulated through the cooling reservoir. In the preferred construction, I provide a connection between the inlet valve, the discharge valves, the transferring switch, and the reversing switch, so that they may be substantially simultaneously operated to reverse the motor and transfer the secondary from one rheostat to the other.

My invention will be more clearly understood by reference to the accompanying drawing, in which the single figure diagrammatically represents the elements of the apparatus and the manner of connecting them together.

The motor which is to be started and controlled is indicated at 10 as of the induction type and is provided with slip rings 11. For the sake of illustration, it is shown as geared to a winding drum 12, although my device is applicable for many other uses of the motor. Power is supplied from the mains 13.

Interposed between the mains and the primary winding of the motor, I have shown a reversing switch 20 comprising electromagnetically-operated switches 21 provided with suitable interlocks and actuated through the control switch 22. As the control switch is moved to one position or the other, two of the phases of the connections between the supply and the primary winding will be interchanged.

At 30 and 31 I have indicated two liquid rheostats adapted to be connected to the secondary winding of the induction motor. These rheostats are preferably provided with plates of different lengths, and to illustrate this feature I have shown a set of long plates 32 and a set of short plates 33 connected in parallel with each other. The discharge valve 34 is shown as forming a part of the weir 35.

It will be noted that the lower side of the opening of the discharge valve is at such a distance above the bottom of the tank that the lower ends of the long plates 32 are always submerged. When the discharge valve 34 is closed, and the liquid pumped in to fill the tank of the rheostat, it will overflow from the weir into the overflow tank 36, from which it is led by a suitable pipe to the cooling reservoir 37. A pump 38, here indicated as of the centrifugal type, is driven by any suitable means, as the motor 39, here shown as supplied with power from the mains 13. Interposed between the pump and the pipes leading to the rheostat tanks is an inlet valve 40, by means of which the fluid may be pumped to one or the other of the rheostats 30 and 31. A transferring switch 45, of any desired type, is interposed between these rheostats and the slip rings of the main motor, in order that the secondary winding thereof may be connected to either rheostat, as desired.

In the preferred embodiment of my construction, an operating rod 50 is provided, which is connected to the control switch 22, transferring switch 45, discharge valves 34, and the inlet valve 40. The connection between the operating rod and the discharge valves is here indicated as consisting of a bell crank and latch rod, the two being so arranged that when one valve is closed the other is open. The handle 51 is provided for the convenient manipulation of this operating rod.

The operation of my device will be understood by tracing through a cycle of operations. Let us suppose that the operating rod has been moved to its lower position so that the reversing switch has connected the motor to the mains, and so that the winding drum is being driven in a direction for unwinding. The secondary winding of the motor will then be connected to the rheostat 30 by means of the transferring switch 45, and the discharge valve of this rheostat will be closed. Because of the low level of the liquid in the tank when the motor is started, a high resistance is inserted in the secondary winding of the motor and the motor started at low speed. At the same time the inlet valve 40 has been moved to a position so that the pump 38 is supplying liquid from the reservoir 37 to the tank of the rheostat 30, and that the level of the liquid in this tank will gradually increase, thereby decreasing the resistance connected to the secondary winding of the motor. This will cause the motor to be started gradually, the rate of acceleration being determined by the speed at which the liquid rises in the rheostat tank. Let us suppose, now, that it is desired to brake the winding drum by reversing the motor. It will only be necessary, then, to move the operating rod to the upper position, whereupon the connection between the supply and the primary winding will be reversed and the secondary winding transferred to the rheostat 31. At the same time, the discharge valve of the rheostat 30 is opened, and that of the rheostat 31 is closed. It will now be seen that because of the low level of the liquid in the tank of rheostat 31, a very substantial resistance will have been inserted in the secondary of the main motor. The result will be that the motor will attempt to run in the reverse direction at a reduced speed. As the tank of the rheostat 31 fills with liquid, due to the action of the pump 38, the resistance connected to the secondary will be decreased and the motor 10 will attempt to run in the reverse direction at an increased speed. It will thus be seen that a gradual deceleration is provided for, and that there will be no shock due to the reversal of the primary connections. Since the manipulation of the handle 51 is all that is required to secure this result, it will be seen that I have designed a simple and convenient mechanism for starting and controlling an asynchronous motor whose secondary is connected to a liquid rheostat.

I conceive that various modifications of the particular arrangement which I have shown may be made, and I accordingly do not desire to be limited thereto, but seek to cover in the appended claims all such modifications as come within the true scope and spirit of my invention.

What I claim as new and desire to secure by Letters Patent of the United States, is,—

1. In combination, a source of supply, an asynchronous motor, connections between the primary of said motor and said source, a plurality of liquid rheostats, connections between said rheostats and the secondary of said motor, means for circulating a liquid through said rheostats, means for reversing the connections to the primary of said motor, means for transferring the secondary from one rheostat to another, and means for controlling said circulating means and the liquid level in said rheostats.

2. In combination, a source of supply, an asynchronous motor, connections between the primary of said motor and said source, a plurality of liquid rheostats, connections between said rheostats and the secondary of said motor, discharge valves for said rheostats, means for circulating a liquid through said rheostats, an inlet valve between said circulating means and said rheostats, a reversing switch in said primary connections, a transferring switch in said secondary connections, and means for substantially simultaneously opening the discharge valve of one rheostat and the inlet valve of the other.

3. In combination, a source of supply, an asynchronous motor, connections between the primary of said motor and said source, a plurality of liquid rheostats, connections between said rheostats and the secondary of said motor, discharge valves for said rheostats, means for circulating a liquid through said rheostats, an inlet valve between said circulating means and said rheostats, a reversing switch in said primary connections, a transferring switch in said secondary connections, and means for substantially simultaneously operating said valves so that one of said discharge valves is open when the other is closed.

4. In combination, a source of supply, an asynchronous motor, connections between the primary of said motor and said source, a plurality of liquid rheostats, connections between said rheostats and the secondary of said motor, means for circulating a liquid through said rheostats, and means for controlling said circulating means, controlling the liquid level in said rheostats, reversing the connections to the primary of said motor and substantially simultaneously transferring the secondary from one rheostat to another.

5. In combination, a source of supply, an asynchronous motor, connections between the primary of said motor and said source, a plurality of liquid rheostats, connections between said rheostats and the secondary of said motor, discharge valves for said rheostats, means for circulating a liquid through said rheostats, an inlet valve between said circulating means and said rheostats, a reversing switch in said primary connections, and a transferring switch in said secondary connections.

6. In combination, a source of supply, an asynchronous motor, connections between the primary of said motor and said source, a plurality of liquid rheostats, connections between said rheostats and the secondary of said motor, discharge valves for said rheostats, means for circulating a liquid through said rheostats, an inlet valve between said circulating means and said rheostats, a reversing switch in said primary connections, a transferring switch in said secondary connections, and means for substantially simultaneously operating said switches and said valves so that one of said discharge valves is open when the other is closed.

In witness whereof, I have hereunto set my hand this eighteenth day of July, 1914.

RALPH DAVID GIVEN.

Witnesses:
CHARLES H. FULLER,
J. A. FOSTER.